United States Patent
Urresty et al.

(10) Patent No.: US 12,021,436 B2
(45) Date of Patent: Jun. 25, 2024

(54) COOLING OF ACTIVE ELEMENTS OF ELECTRICAL MACHINES

(71) Applicant: General Electric Renovables Espana, S.L., Barcelona (ES)

(72) Inventors: Julio Cesar Urresty, Barcelona (ES); Sadeo Ramtahal, Schenectady, NY (US); Pawel Siwak, Warsaw (PL); Cesar Muñiz Casais, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/868,993

(22) Filed: Jul. 20, 2022

(65) Prior Publication Data
US 2023/0033170 A1    Feb. 2, 2023

(30) Foreign Application Priority Data

Jul. 27, 2021   (EP) .................................. 21382693

(51) Int. Cl.
*H02K 5/20*     (2006.01)
*F03D 80/60*    (2016.01)
*H02K 7/18*     (2006.01)

(52) U.S. Cl.
CPC ............. *H02K 5/207* (2021.01); *F03D 80/60* (2016.05); *H02K 7/1838* (2013.01); *F05B 2260/20* (2013.01)

(58) Field of Classification Search
CPC ........ H02K 5/207; H02K 7/1838; H02K 9/02; H02K 9/04; H02K 9/12
See application file for complete search history.

(56) References Cited

U.S. PATENT DOCUMENTS

| 6,798,079 B2 * | 9/2004 | Nelson ..................... H02K 9/06 310/58 |
| 7,405,491 B2 * | 7/2008 | Matsukuma ........... F01K 13/006 310/58 |

(Continued)

FOREIGN PATENT DOCUMENTS

| EP | 2642639 A1 | 9/2013 |
| EP | 2806542 A1 | 11/2014 |

(Continued)

OTHER PUBLICATIONS

WO 2006032515 A1 Machine Translation (Year: 2006).*

(Continued)

*Primary Examiner* — Tran N Nguyen
*Assistant Examiner* — Masoud Vaziri
(74) *Attorney, Agent, or Firm* — Dority & Manning, P.A.

(57) ABSTRACT

The present disclosure relates to electrical machines, cooling systems and methods for cooling active elements of electrical machines. More in particular, the present disclosure relates to cooling systems and methods for cooling active rotor and/or stator elements of a generator of a wind turbine, e.g. of a direct drive wind turbine. A cooling method comprises supplying a cooling fluid to an air gap through one or more primary inlets of an electrical machine for cooling a plurality of active elements of a rotor of the electrical machine and/or a plurality of active elements of a stator of the electrical machine separated by the air gap. The method further comprises reversing a direction of flow of the cooling fluid such that the cooling fluid is extracted from the electrical machine through one or more primary inlets.

8 Claims, 6 Drawing Sheets

(56) References Cited

U.S. PATENT DOCUMENTS

| | | | | |
|---|---|---|---|---|
| 7,427,814 B2* | 9/2008 | Bagepalli | ............... | H02K 9/02 |
| | | | | 290/55 |
| 9,356,490 B2* | 5/2016 | De Graaff | ............... | H02K 9/12 |
| 9,624,908 B2* | 4/2017 | Airoldi | .................... | F03D 9/25 |
| 11,067,001 B2* | 7/2021 | Fontalbat | ............... | H02K 9/06 |
| 2004/0066099 A1* | 4/2004 | Weeber | ................. | H02K 55/04 |
| | | | | 310/58 |
| 2005/0035673 A1* | 2/2005 | Lafontaine | .......... | H02K 1/2791 |
| | | | | 310/58 |
| 2012/0025641 A1* | 2/2012 | Harb | ....................... | H02K 9/12 |
| | | | | 310/59 |
| 2013/0249333 A1* | 9/2013 | De Graaff | ......... | H02K 15/0006 |
| | | | | 310/59 |

FOREIGN PATENT DOCUMENTS

| | | | | |
|---|---|---|---|---|
| WO | WO-2006032515 A1 * | 3/2006 | ............ | F03D 80/00 |
| WO | WO-2019039211 A1 * | 2/2019 | ............ | B60K 11/02 |

OTHER PUBLICATIONS

WO2019039211A1 Machine Translation (Year: 2019).*
European Search Report Corresponding to EP21382693 on Jan. 12, 2022.

* cited by examiner

COOLING OF ACTIVE ELEMENTS OF ELECTRICAL MACHINES

TECHNICAL FIELD

The present disclosure relates to electrical machines, cooling systems and methods for cooling active elements of electrical machines. More in particular, the present disclosure relates to cooling systems and methods for cooling active rotor and/or stator elements of a generator of a wind turbine, e.g. of a direct drive wind turbine.

BACKGROUND

Electrical machines, such as motors and generators, generally comprise a rotor structure and a stator structure. Large electrical generators may be e.g. electrically excited generators or permanent magnet excited generators (PMG). The rotor of an electrical machine rotates with respect to the stator. The rotor may be the inner structure and the stator the outer structure. The stator in this case thus surrounds, e.g. radially, the rotor. Alternatively, the configuration may be the opposite, i.e. the rotor surrounds, e.g. radially, the stator.

Such generators may be used for example in wind turbines. Wind turbines generally comprise a rotor with a rotor hub and a plurality of blades. The rotor is set into rotation under the influence of the wind on the blades. The rotation of the rotor shaft either drives the generator rotor directly ("directly driven") or through the use of a gearbox.

A direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, generators may also be coupled to a gearbox which increases the rotational speed of the generator to for example between 50 to 500 rpm or even more.

In electrical machines, such as generators of direct drive wind turbines, cooling is generally important. In particular, the active elements of the rotor and the stator, e.g. permanent magnets and coils, may heat up. An increase in temperature of the active rotor and stator elements may lead to failure of the active elements and may reduce the efficiency of the generator. To reduce the temperature of the active elements of the rotor and the stator, a cooling fluid may be run through the air gap separating the active elements. The cooling fluid contacts the active elements and takes heat from them away. A cooling system may be provided for guiding the cooling fluid towards and away from the air gap, and thus removing heat from the active elements of the rotor and the stator.

Such a cooling system may comprise a primary or "main" path or loop. A main loop may include a fluid inlet for a main fluid. A main fluid may be carried from the main fluid inlet to the active rotor and stator elements. For example, air may be directed to an air gap between the active rotor and stator elements. During operation, the active elements heat up, and the cooling fluid (which may also be air) is heated up too. The heated main fluid may be then carried away to a main fluid outlet. In some examples, the main fluid outlet and inlet may fluidly communicate with an exterior of the wind turbine, e.g. the air surrounding the nacelle. For example, the cooling system may comprise fans, e.g. in the nacelle, for introducing air from an outside of the wind turbine through the main fluid inlet. Conduits may carry the main loop fluid from the main cooling fluid inlet to the generator air gap, and then conduits may carry the heated main cooling fluid from the generator air gap to the fluid outlet.

In other examples, the main fluid inlet and the main fluid outlet may fluidly communicate with a heat exchanger. A secondary path or loop for the cooling fluid may include the heat exchanger. A heat exchanger may comprise a heat exchanger main cooling fluid inlet, a heat exchanger main cooling fluid outlet, a heat exchanger secondary fluid inlet and a heat exchanger secondary fluid outlet. The main cooling fluid (i.e. the fluid used for cooling elements in the air gap, herein generally referred to as "cooling fluid") heated in the generator air gap may be guided into the heat exchanger through the heat exchanger main cooling fluid inlet. A secondary fluid (i.e. a fluid that does not cool elements in the air gap directly but rather is used to cool the main cooling fluid or "cooling fluid") may be introduced into the heat exchanger through the heat exchanger secondary fluid inlet. The secondary fluid may cool the main cooling fluid. The secondary fluid may be removed from the heat exchanger through the heat exchanger secondary outlet and the main fluid may be removed from the heat exchanger through the heat exchanger main outlet. The secondary fluid may for example be water or air. Conduits may be used to guide the heated main cooling fluid inside the heat exchanger and then, once cooled down, out of it. The cooled main cooling fluid may then be directed again towards the air gap between the active elements of the rotor and the stator.

SUMMARY

In an aspect of the present disclosure, a method for cooling an electrical machine is provided. The electrical machine comprises a rotor including a plurality of active rotor elements, a stator including a plurality of active stator elements, and an air gap separating the active rotor elements and the active stator elements. The method comprises supplying a cooling fluid to the air gap through one or more primary inlets of the electrical machine for cooling the plurality of active elements of the rotor and/or the plurality of active elements of the stator. The method further comprises reversing a direction of flow of the cooling fluid such that the cooling fluid is extracted from the electrical machine through one or more of the primary inlets According to this aspect, a cooling fluid may be supplied to the air gap in a first direction during a certain amount of time, and then the cooling fluid may be supplied to the air gap in a second direction different from, e.g. opposite to, the first direction. Switching the direction of the flow of the cooling fluid changes the heat distribution in the air gap. When the cooling fluid is supplied in a first direction, the active elements which first contact the cooling fluid are cooled more than the active elements which contact the cooling fluid later on, when the temperature of the cooling fluid has already increased. When supplying the cooling fluid in a second, e.g. opposite, direction, the active elements that were cooled the least before may now be cooled more as they cooling fluid may be cooler when contacting them. Likewise, the active elements that were cooled the most before, may now be cooled less, as the cooling fluid may have heated up when reaching them.

As the heat load may be more distributed between active elements and/or active element may be kept at a relatively high temperature during a shorter period of time due to reversing the direction of the cooling flow, failure of the active elements, e.g. failure of the insulation surrounding the active elements, may be postponed, and may even be eliminated (within the expected lifetime of the electrical machine). The service life of the electrical machine may therefore be extended, and the need for repairs reduced. The lifetime of the insulation of the active elements may be increased about 50% or more, even about 100%. For example, the service life of the insulation of coils for a direct drive wind turbine, e.g. for a stator of the generator, may be increased from about 25 years to about 50 years in some examples.

Also, as the rotor of the electrical machine rotates in use, switching the direction of the cooling fluid may not only modify the heat distribution in the direction in which the cooling fluid is supplied to the air gap, e.g. axially, but also in a circumferential direction. The temperature of the active elements may therefore change in a direction in which the cooling fluid is supplied to the air gap, e.g. axially, as well as in a circumferential direction. This may further contribute to enhancing the service life of the active rotor and/or stator elements.

Furthermore, as the temperature distribution in the active elements varies when reversing the direction of the cooling fluid, and thus the location of the hot spots varies as well, it may be bearable for the active elements to withstand higher temperatures as they would withstand the higher temperatures for a shorter period of time. This may allow increasing the power output of the electrical machine.

Throughout this disclosure, a primary inlet (outlet) of the electrical machine may be understood as an entry (exit) point to (from) the electrical machine for the cooling fluid in a first mode of operation. In a second mode of operation, the primary inlet (out) can be an exit (entry) point of the electrical machine for the cooling fluid.

Active elements, as used throughout the present disclosure, may be regarded as elements of the rotor and/or the stator that are magnetically and/or electrically active. An active stator element may for example be one or more permanent magnets, one or more permanent magnet modules, one or more coils, or one or more coil modules. An active rotor element may likewise be one or more permanent magnets, one or more permanent magnet modules, one or more coils, or one or more coil modules. For example, an active stator element may be a coil, and an active rotor element may be a permanent magnet module. In other examples, both the active stator elements and the active rotor elements may be coils.

An electrical machine may be a generator, in particular a generator for a wind turbine, and more in particular a generator for a direct drive wind turbine.

In a further aspect, an electrical machine assembly is provided. The electrical machine assembly comprises an electrical machine and a cooling system fluidly connected to the electrical machine. The electrical machine comprises a rotor including a plurality of active rotor elements, a stator comprising a plurality of active stator elements, and an air gap separating the active rotor elements and the active stator elements. The cooling system comprises one or more entry cooling conduits configured to guide a cooling fluid towards the air gap, and one or more exit cooling conduits configured to collect and guide the cooling fluid heated in the air gap away from the electrical machine. The cooling system is configured to reverse the direction of flow of the cooling fluid.

In yet a further aspect, a generator assembly is provided. The generator assembly comprises a generator and a cooling system fluidly connected to the generator. The generator comprises a rotor including a plurality of active rotor elements, a stator comprising a plurality of active stator elements, and an air gap separating the active rotor elements and the active stator elements. The cooling system comprises a plurality of conduits configured to guide a cooling fluid towards the air gap and away from the generator. The cooling system is configured to guide the cooling fluid in a first direction and in a second direction different from the first direction such that the cooling fluid is run in two different directions through the air gap.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Although a generator for a direct drive wind turbine is mainly referred to herein, the invention can be applied in general to electrical machines.

Figure 1:
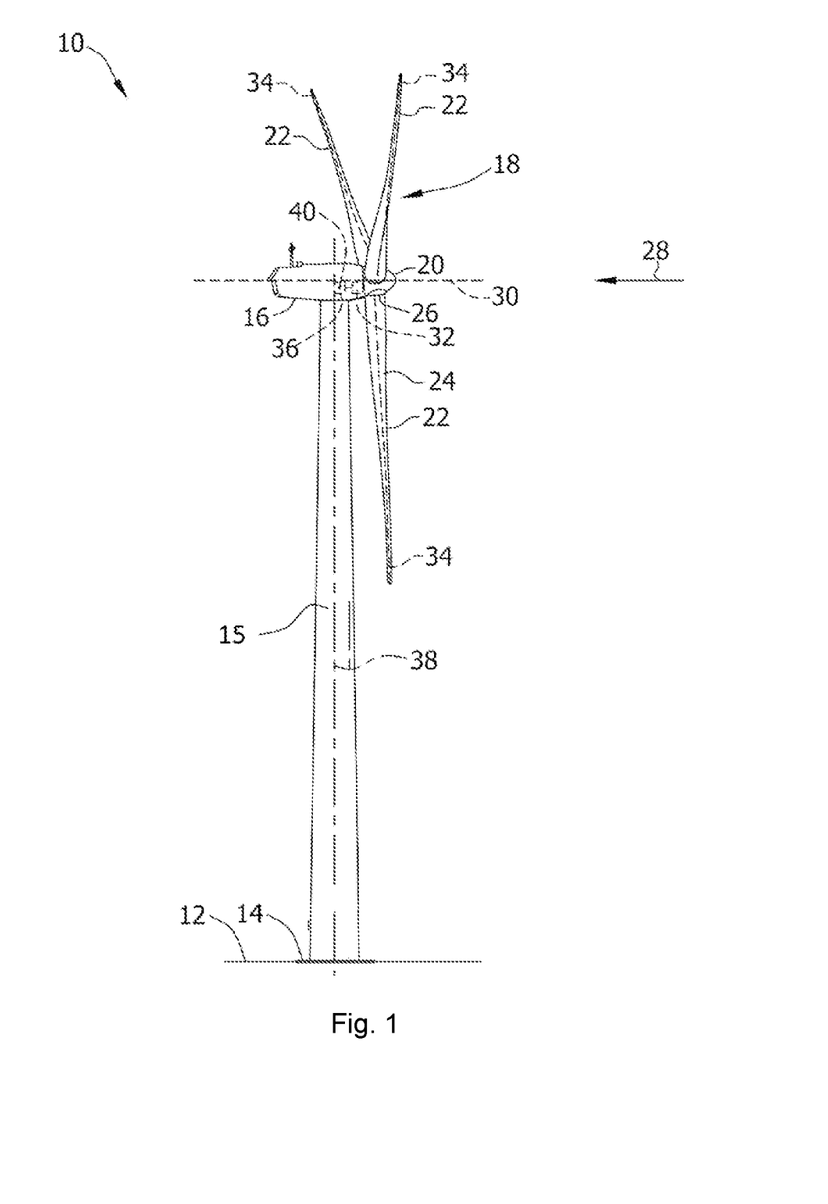
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower. A wind turbine 10 may be placed both onshore and offshore.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
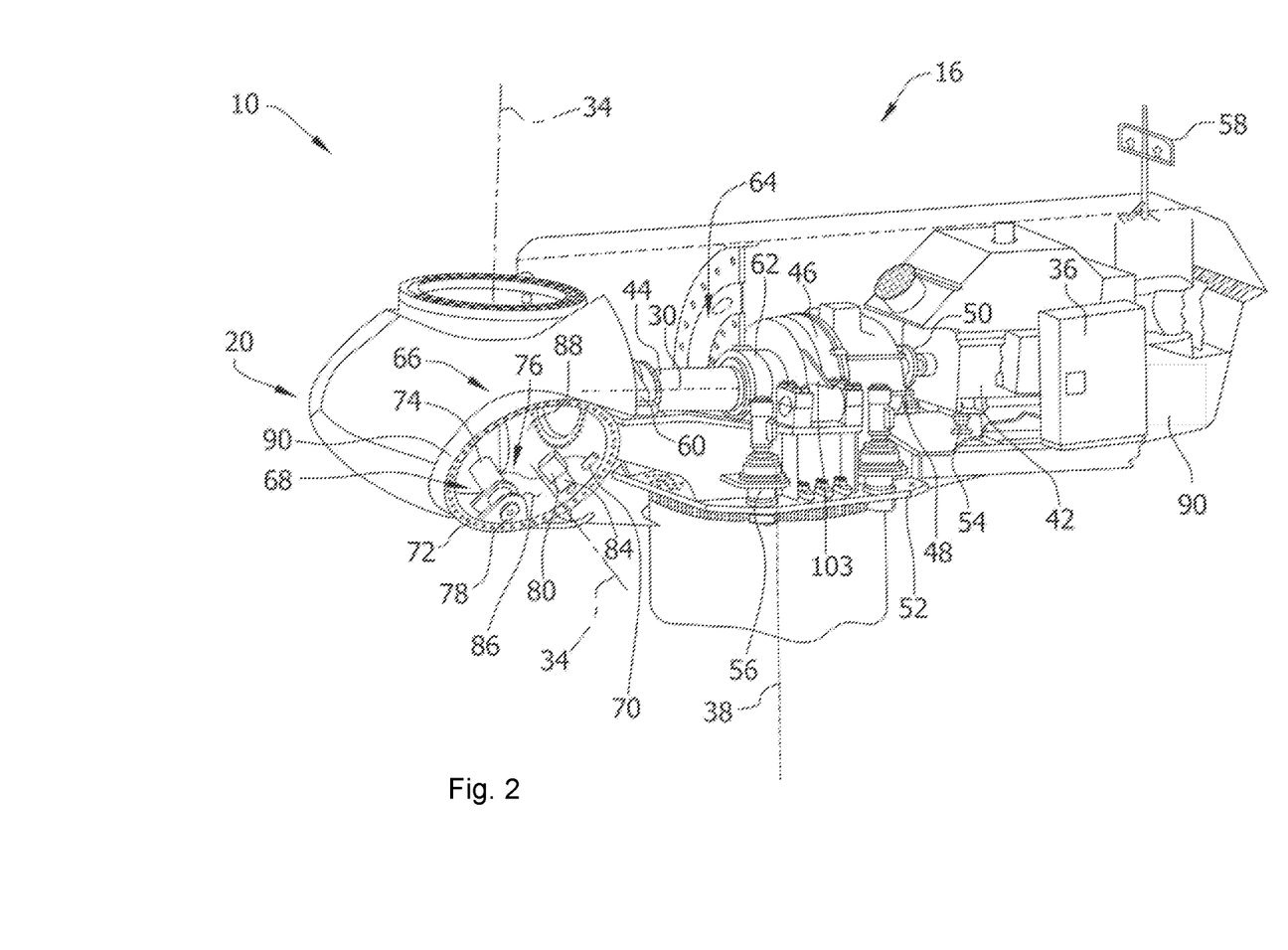
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
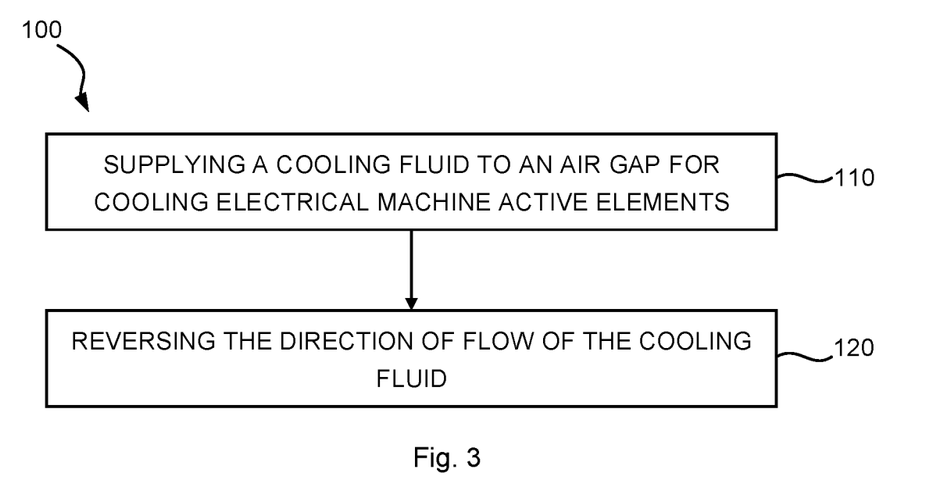
FIG. 3 schematically illustrates a flowchart of an example of a method for cooling active rotor and stator elements.

In an aspect of the disclosure, a method 100 for cooling an electrical machine 200 is provided. The method is depicted in FIG. 3. The electrical machine 200 comprises a rotor 210 including a plurality of active rotor elements 212, a stator 220 including a plurality of active stator elements 222, and an air gap 215 separating the active rotor elements 212 and the active stator elements 222.

The method comprises, at block 110, supplying a cooling fluid 140 to an air gap 215 through one or more primary inlets 236, 256 of an electrical machine 200 for cooling a plurality of active elements 212 of a rotor 210 of the electrical machine 200 and/or a plurality of active elements 222 of a stator 220 of the electrical machine 200 separated by the air gap 215.

Figure 4A:
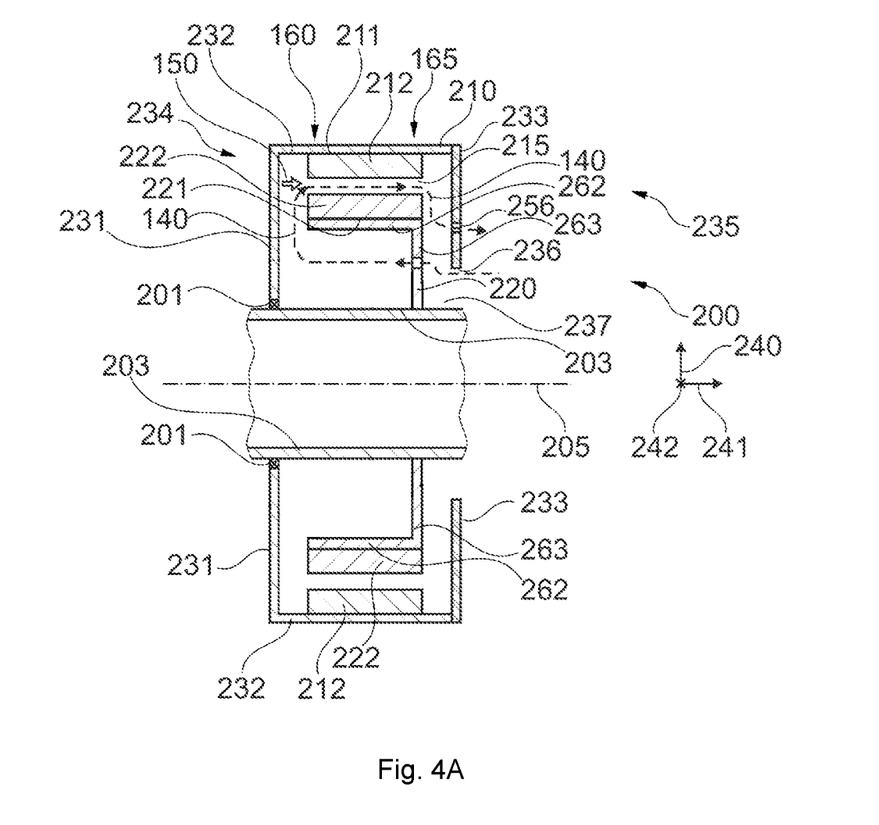
FIGS. 4A and 4B schematically illustrate a cross-section of an example of an electrical machine where a cooling fluid is run through the air gap in two different directions.

An electrical machine 200 may be a generator for a wind turbine 10, for example a generator for a direct drive wind turbine. FIG. 4A shows a cross-sectional view of an example of a generator 200 comprising a rotor 210 and a stator 220. The rotor 210 is configured to rotate about an axis of rotation 205. The rotor 210 comprises a rotor rim 211 and a plurality of active rotor elements 212 attached to the rotor rim 211. The stator 220 comprises a stator rim 221 and a plurality of active stator elements 222 attached to the stator rim 221.

The rotor 210 may comprise a drive side cover 231 and a central side cover 232. The drive side cover 231 may be also referred to as front side cover 231 and may be configured to face a wind turbine hub 20. I.e. the drive side 234 of the generator may be defined as the side from which it is driven, in this case by the rotor of the wind turbine. In case of a motor, the drive side of the motor may be defined as the side at which it drives motorized elements. The non-drive side 235 of the generator may be opposite to the drive side of the generator.

As may be seen in this example, a drive side cover 231 may mainly extend in a radial 240 and in a tangential or circumferential direction 242. A drive side cover 231 may protect the active elements of the rotor and the stator from moisture and undesirable particles in the wind such as dust in an axial direction 241. A central side cover 232 may include the rotor rim 211, and may mainly extend in a circumferential direction 242 and in an axial direction 241. The rotor may further comprise a non-drive side cover 233. The non-drive side cover 233 may be also referred to as back side cover 233. The central side cover 232 may extend between the drive side cover 231 and the non-drive side cover 233 of the rotor 210.

Similarly, the stator 220 may comprise a central side plate 262 and a non-drive or back side plate 263. In some examples the stator 220 may additionally comprise a drive or front side plate (not shown in the figures). The stator 220 may be fixedly mounted on a generator support 203. The rotor 210 may be rotatably mounted on the generator support 203 and may be operatively connected to a hub 20 or other part of a wind turbine rotor. The drive side cover 231 of the rotor 231 may be supported by the generator support 203 through a bearing 201. If the rotor 210 comprises a non-drive side cover 233 which extends up to the generator support 203, a bearing may also be used to join the non-drive side cover 233 to the support 203. The generator support 203 may be a wind turbine frame, for example a front portion of a direct drive wind turbine frame.

In this example, a cooling system may be arranged at the non-drive side of the generator 200, e.g. at the non-drive side cover 233. For example, an air extraction system and/or an air supply system may be arranged at the non-drive side 235 of the generator. It may be seen that in this example, the non-drive side cover 233 extends radially inwards but does not extend completely until touching the generator support 203. In the radial space 237 provided between cover 233 and generator support 203, cooling air conduits for supplying and extracting a cooling fluid, e.g. air, may be arranged. A primary inlet 236 and a primary outlet 256 may be provided in space 237 between the non-drive side cover 233 of the rotor and the generator support 203.

In this example, the air gap 215 is a radial air gap and the generator 200 is a radial generator, but in other examples the generator 200 may be an axial generator with an axial air gap. In FIG. 3, the rotor 210 surrounds the stator 220. In other examples, the stator may surround the rotor.

FIG. 4A schematically illustrates that a cooling fluid 140 may be supplied in a first direction 150 to the air gap 215 for cooling the active rotor 212 and/or stator 222 elements. The cooling fluid 140 may for example be introduced in the generator 200 through a primary inlet 236 at the back side cover 233 of the rotor 210, then guided through the stator 220 towards the rotor front side cover 231, and then directed towards the air gap 215. A shape of the stator and the rotor may already serve to guide the cooling fluid 140 through the generator 200, or one or more conduits may be used for guiding the cooling fluid 140 through the generator.

The cooling fluid 140 in this example first contacts the active elements 212, 222 at or near a drive side or front region 160 of the generator and, as the active elements are hot, the temperature of the cooling fluid is increased. The cooling fluid 140 then advances towards the back side cover 233 of the rotor. When reaching the active elements 212, 222 in a non-drive side or back region 165 of the generator, the cooling fluid 140 is already warm, and thus the temperature of the active elements in the back region 165 may not be reduced as much as the temperature of the active elements in the front region 160. Hot spots may therefore be created in the back region 165, and the active elements in this region 165 may be at a higher risk of overheating and failure than the active elements in the front region 160. The now heated cooling fluid 140 may be exhausted through a primary outlet 256 at the back side cover 233 of the rotor 210.

Figure 4B:
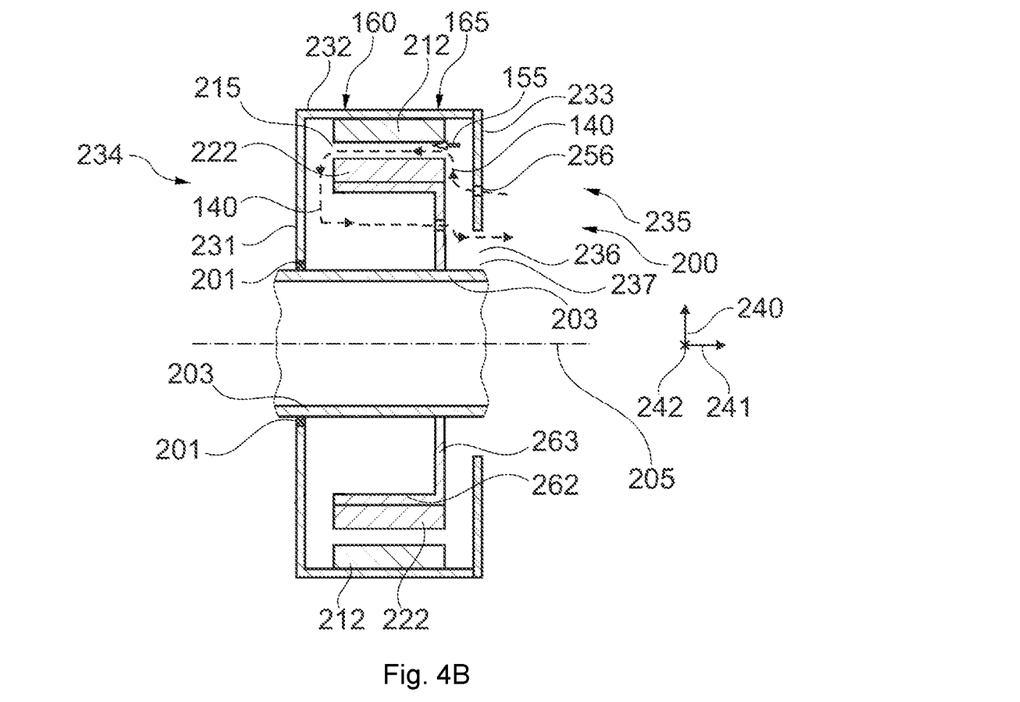

In FIG. 4A, as well as in FIG. 4B, a primary inlet 236 of the generator and a primary outlet 256 of the generator for the cooling fluid 140 are shown as aligned along a radial direction 240. It should be noted that this is merely illustrative, and that a primary inlet 236 thorough which a cooling fluid may be introduced in an inside of the generator 200, and a primary outlet 256 through which the cooling fluid may be exhausted may not necessarily be aligned in a radial direction 240. For example, a primary inlet 236 and a primary outlet 256 for the cooling fluid 140 may be displaced along a circumferential 242 direction. Also, the primary inlet and primary outlet may be provided in the gap 237. For example, a conduit may guide the cooling fluid 140 towards an inside of the generator 200 through space 237 at a first circumferential position, and another conduit may guide the heated cooling fluid 140 away from the generator through the gap 237 at a second circumferential position.

The method of FIG. 3 further comprises, at block 120, reversing a direction of flow of the cooling fluid 140 such that the cooling fluid 140 is extracted from the electrical machine 200 through one or more, e.g. all, of the primary inlets 236.

FIG. 4B schematically illustrates this. The cooling fluid 140 now enters the generator 200 through primary outlet 256 at the back side cover 233 of the rotor 210 and is guided towards the air gap 215. The rotor or generator primary inlet 236 in FIG. 4A therefore becomes the outlet 236 in FIG. 4B, and the rotor or generator primary outlet 256 in FIG. 4A therefore becomes the inlet 256 in the mode of operation of FIG. 4B. As the direction of flow has been inverted, the cooling fluid now first contacts the active elements 212, 222 in the back region 165, then heats up as it advances axially through the air gap, and then contacts the active elements in the front region 160. In this operation, the active elements in the back region 165 may be cooled more than the active elements in the front region 160. Hot spots are therefore more likely to be formed in the front region 160.

As the rotor 210 rotates, the temperature distribution of the active elements and of the air gap 215 may be non-homogeneous along a circumferential direction 242 as well. If the cooling flow is reversed, this can also influence the cooling along the circumferential direction 242. Therefore, which active elements 212, 222 are cooled more and cooled less can be changed along the entire air gap, i.e. both in the axial 241 and in the circumferential 242 directions. As the active elements 212, 222 having a highest temperature have changed due to the reversal of the flow of the cooling fluid, failure due to overheating may be reduced, and possibly be avoided. The need of repairs may also be decreased. For example, insulation, e.g. electrical insulation, of the active elements may not need to be replaced. Furthermore, as the hot spots are not located always in the same place, the active elements 212, 222 may stand a higher temperature and the power generated by the generator 200 may be increased. Therefore, depending on the requirements for the electrical machine 200, a suitable combination of extending the achievable lifetime of the active elements 212, 222 and their insulation, and increasing the power output may be achieved.

Any suitable cooling fluid 140 may be used, and in particular different cooling gases may be used. In some examples, air is used as cooling fluid.

A time period during which the cooling fluid 140 is supplied in a particular direction may be substantially equal or different from a time period during which the cooling fluid 140 is supplied in another direction. The cooling fluid 140 may be supplied through the air gap 215 from one or more primary inlets 236 of the electrical machine 200 to one or more primary outlets 256 of the electrical machine 200 during a first period. The cooling fluid 140 may be supplied through the air gap 215 from the one or more primary outlets 256 to the one or more primary inlets 236 during a second period. The second period may be substantially equal to the first period in some examples. The second period may be different from the first period in other examples.

As illustrated in the example of FIG. 4A, the cooling fluid 140 may be supplied to the air gap 215 in a first direction 150 during a first period. And as illustrated in the example of FIG. 4B, the cooling fluid 140 may be supplied to the air gap 215 in a second direction 155 during a second period. The second direction 155 may be opposite to the first direction 150. In some examples, the first 150 and second directions 155 may be substantially axial directions 241.

Reversing the direction of the cooling fluid 140 may be performed in more than one way. For example, if one or more fluid displacement devices 310 are used for causing or helping the cooling fluid to flow towards the air gap 215 for cooling the active elements, reversing 120 may comprise reversing the direction of rotation of the one or more fluid displacement devices 310, e.g. one or more rotary elements inside a fluid displacement devices. A fluid displacement device 310 is configured to drive the cooling fluid 410 in a particular direction, e.g. by creating a pressure difference between two points of a path for the cooling fluid, and thus creating regions with lower pressure towards which the cooling fluid will flow. A fluid displacement device 310 may e.g. be a pump or a fan. Inverting the direction of rotation of the fluid displacement devices 310 may be performed during maintenance or repair operations of the wind turbine 10. For example, reversing the direction of rotation may be manually performed when motors of the fluid displacement devices are replaced.

The one or more cooling fluid displacement devices 310 may include one or more impellers. Reversing 120 may comprise switching the direction of rotation of the one or more impellers. In some examples, the impellers may be bidirectional. The motor(s) of a fluid displacement device 310 may be configured to rotate the bidirectional impellers in two opposite directions of rotation.

Figure 5A:
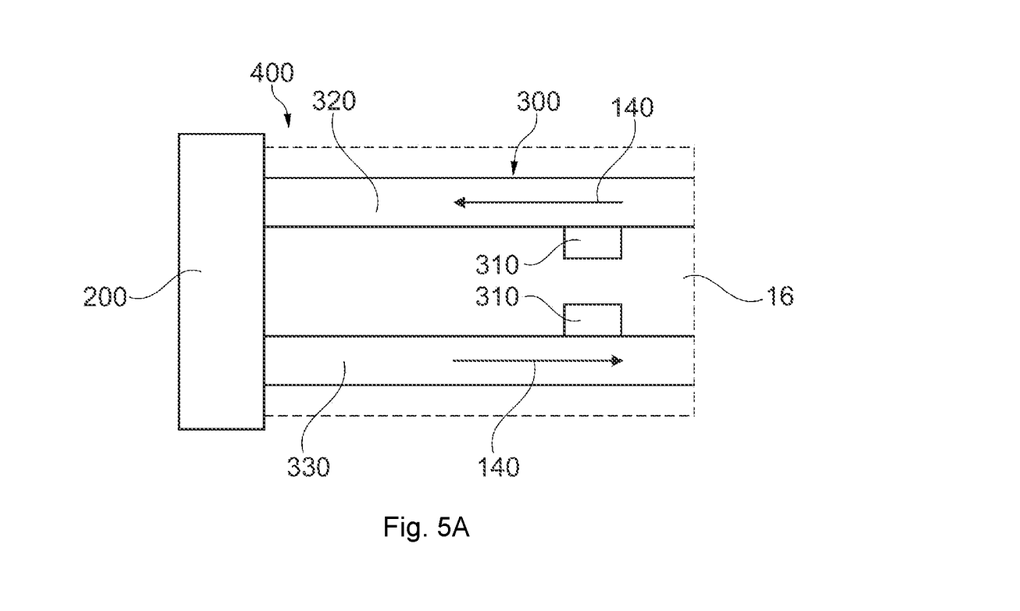
FIGS. 5A and 5B schematically illustrate a side view of an electrical machine fluidly connected to a cooling system according to two examples.
Figure 5B:
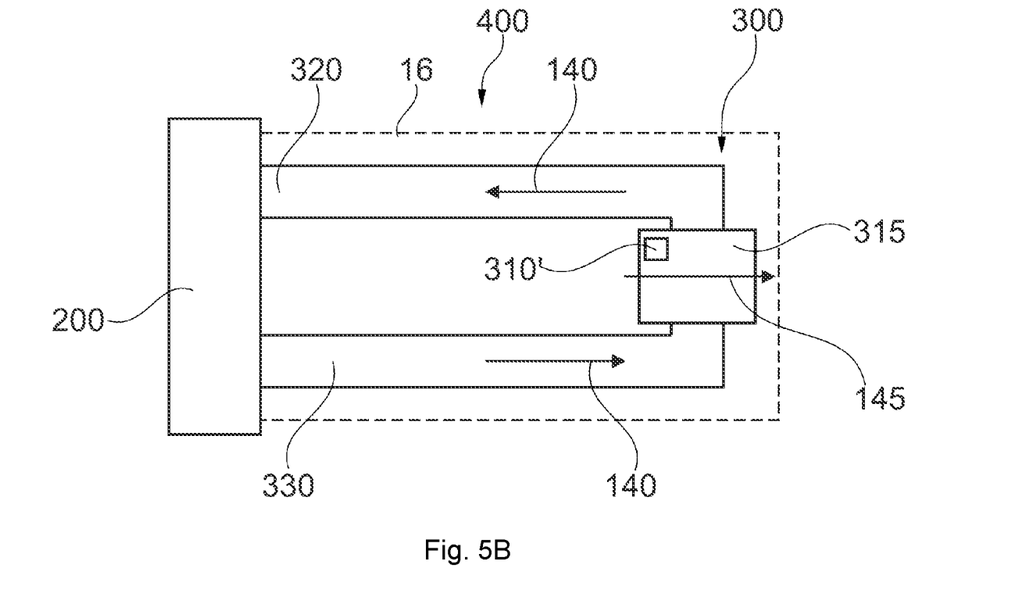

FIGS. 5A and 5B schematically illustrate a side view of two examples of a cooling system 300 fluidly connected to an electrical machine 200. In FIG. 5A, an entry conduit 320 is configured to carry a cooling fluid 140 to the generator 200, and an exit conduit 330 is configured to carry a heated cooling fluid 140 away from the generator 200. One or more filters may be arranged in the conduits to condition the air. The entry 320 and exit 330 conduits may for example fluidly connect an outside of the nacelle 16 with the generator 200. Each conduit 320, 330 has an inlet and an outlet. One or more cooling fluid propulsors 310, e.g. one or more fans, are configured to cause the cooling fluid 140 to move through the conduits 320, 330, e.g. through the entry conduit 320 towards the generator 200 and through the exit conduit 330 away from the generator 320. The one or more cooling fluid propulsors 310 are configured to invert their direction of rotation such that the cooling fluid 140 advances in an opposite direction. For example, the rotation of one or more fan impellers may be reversed. The exit conduit 330 therefore becomes the entry conduit, and the entry conduit 320 becomes the exit conduit.

One or more cooling fluid displacement devices 310 may be arranged with the entry conduit 320 and/or the exit conduit 330. The fluid displacement devices 310 may be positioned at any suitable location along the conduits 320, 330, e.g. inside a conduit 320, 330. Depending on the type of the fluid displacement device 310, a fluid displacement device may be placed outside a conduit but in fluid contact with it. It is noted that "entry" 236 and "exit" 256 points to/from the electrical machine thus depend on the direction of flow, and may thus change over time, depending on the configuration of the cooling cycle. A primary inlet (for a first or primary cooling flow direction) may thus become an outlet in a second cooling flow direction.

In FIG. 5B, the cooling system 300 comprises a heat exchanger 315 comprising one or more heat exchanger fluid displacement devices 310' for driving a heat exchanger cooling fluid 145 through the heat exchanger 315 for cooling the primary cooling fluid 140. The cooling fluid 140 to be run through the air gap 215 may be referred to as main cooling fluid, and the cooling fluid 145 to be run through the heat exchanger 315 for cooling the main cooling fluid 140 may be referred to as secondary cooling fluid herein. The heat exchanger may include a heat exchanger secondary inlet and a heat exchanger secondary outlet through which a secondary cooling fluid is introduced and removed from the heat exchanger 315, respectively. The heat exchanger further includes a heat exchanger main fluid inlet and a heat exchanger main fluid outlet through which the main cooling fluid 140 is introduced into and removed from, respectively, the heat exchanger 315.

In some examples, the heat exchanger 315 may comprise one or more main fluid displacement devices 310. I.e., instead of, or in addition to, arranging one or more main fluid displacement devices 310 outside the heat exchanger 315, they may be arranged with, e.g. inside, the heat exchanger 315. In some of these examples, a direction of rotation of the fluid displacement devices 310 arranged with the heat exchanger 315, e.g. of rotary element(s) such as impeller(s) therein, may be inverted to switch the direction of the main cooling fluid 140.

Similarly to the cooling fluid displacement devices 310, in some examples, the one or more heat exchanger fluid displacement devices 310' may be pumps or fans. The direction of rotation of the fluid displacement devices 310', e.g. of rotary element(s) such as impeller(s) therein, may be inverted to switch the direction of the secondary cooling fluid 145.

In other examples, reversing 120 may comprise fluidly connecting one or more entry cooling conduits 320 for guiding the cooling fluid 140 towards the air gap 215 with one or more exit cooling conduits 330 for guiding the cooling fluid 140 away from the air gap 215 such that the direction of flow of the cooling fluid 140 is inverted.

I.e., when the cooling fluid 140 is supplied in a first direction 150, the entry cooling conduits 320 and the exit cooling conduits 330 may not be directly (i.e. not through the electrical machine 200 or a heat exchanger 315 in case it is present) and fluidly connected. The entry conduits 320 merely guide the cooling fluid 140 towards the air gap 215, and the exit conduits 330 merely guide the heated cooling fluid 140 away from the air gap 215. For reversing 120 the direction of flow of the cooling fluid 140, the passage of the cooling fluid 140 through additional conduits 340 configured to fluidly connect the entry 320 and exit 330 conduits may be enabled.

Figure 6A:
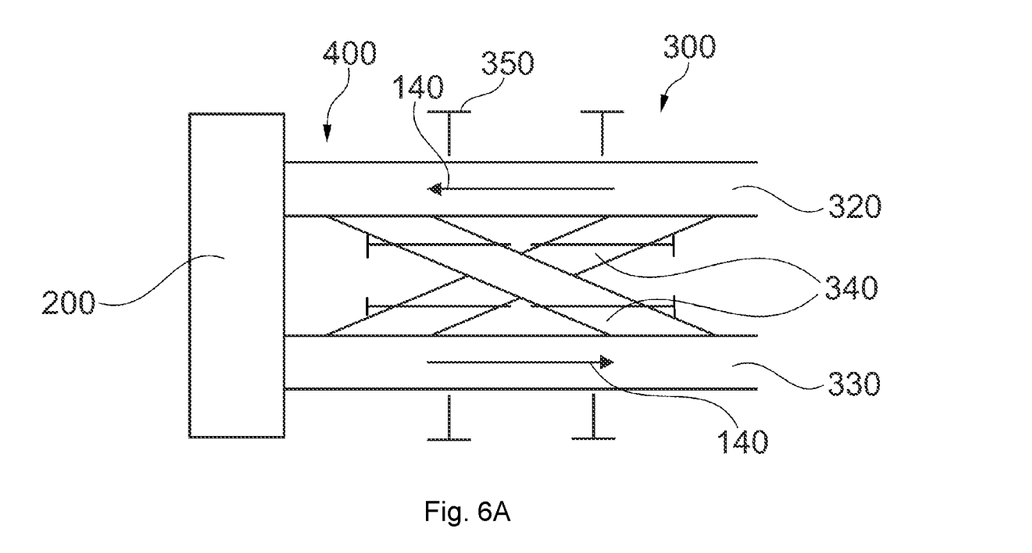
FIGS. 6A and 6B schematically illustrate a side view of an electrical machine fluidly connected to a cooling system according to another example.
Figure 6B:
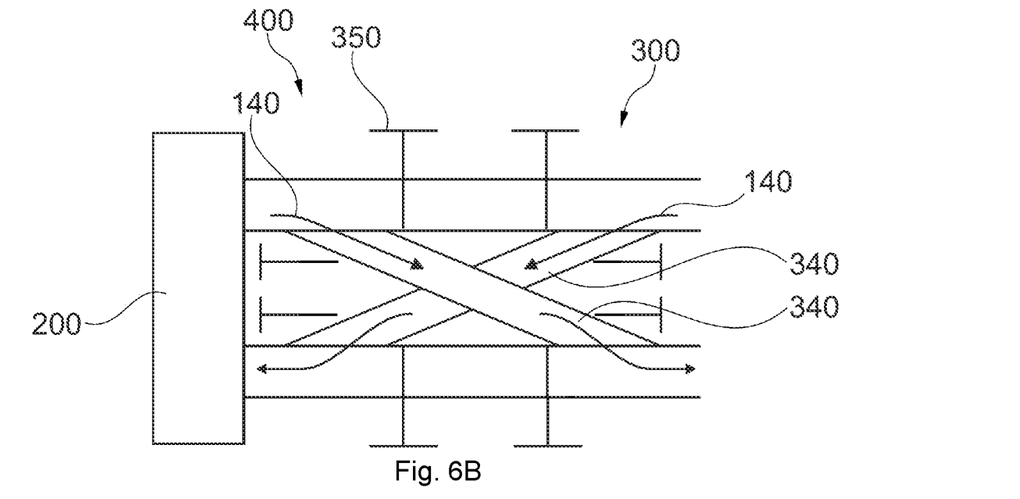

FIGS. 6A and 6B schematically show a lateral view of an electrical machine 200 such as a generator for a direct drive wind turbine 10 and a cooling system 300 fluidly connected to the electrical machine 200. The cooling system 300 may e.g. be provided in the nacelle 16. The cooling system 300 comprises one or more entry conduits 320 and one or more exit conduits 330. The cooling fluid 140, e.g. air, may flow through one or more entry conduits 320 towards the air gap 215, have its temperature increased, and then be collected by and flow through one or more exit conduits 330. As it may be seen in FIGS. 5A-6B, the cooling fluid 140 may be introduced in the generator 200 at a certain circumferential location and collected at another circumferential location.

Additional conduits 340 may, selectively, fluidly connect the one or more entry conduits 320 with the one or more exit conduits 330. The direction of flow of the cooling fluid 340 may therefore be reversed. While the cooling fluid 140 is supplied to the air gap 215 in a first direction 150, the additional conduits 340 may be closed, as shown in FIG. 6A.

The additional cooling conduits 340 may be opened for redirecting the flow of the cooling fluid 140. For example, reversing 120 may comprise operating a plurality of valves 350 for redirecting the cooling fluid 140 through the additional cooling conduits 340 and inverting its direction of flow. As illustrated in FIG. 6B, valves 350 have been operated for changing the course of the cooling fluid 140. Some valves 350 have been operated for closing a portion of the entry 320 and 330 exit conduits, and some valves 350 have been operated for enabling the passage through the additional conduits 340. The valves 350 may be electrically operated in some examples, e.g. by an electrical motor.

In this way, the cooling fluid may be introduced in the generator 200 at a first circumferential position and collected at a second circumferential position when the cooling fluid 140 is circulated in a first direction (FIG. 6A), and the cooling fluid may be introduced in the generator at the second circumferential position and collected at the first circumferential position when the direction of flow of the cooling fluid is reversed (FIG. 6B). The first and second circumferential positions may be different, as in these figures. As was illustrated e.g. with reference to FIG. 4, also the trajectory of the cooling fluid to and from the air gap may be different from these different circumferential positions. In particular, how the cooling fluid traverses the air gap in an axial direction may depend on whether cooling fluid is supplied in accordance with FIG. 6A or in accordance with FIG. 6B.

The cooling conduits 320, 330 of FIGS. 6A and 6B may be fluidly connected to an ambient air surrounding e.g. a nacelle 16, as explained with respect to FIG. 5A, or to a heat exchanger 315, as explained with respect to FIG. 5B.

Although only one entry conduit 320 and one exit conduit 330 are shown in FIGS. 5A-6B, is should be noted than more than one entry conduit 320 and more than one exit conduit 330 may be provided. For example, four entry conduits 320 configured to carry a cooling fluid to different circumferential portions of the generator 200 and four exit conduits 330 configured to carry the cooling fluid away from different circumferential portions of the generator 200 may be provided.

Reversing 120 the direction of the cooling fluid 140 may be performed at least once during the lifetime of the generator 200. In some examples, reversal 120 may be performed only once during the expected service life of the generator 200. Even if the cooling fluid is reversed only once throughout the lifetime of the electrical machine, its performance and/or technical endurance may be improved. Such a single switch may be made e.g. at the occasion of planned (major) maintenance. In some other examples, reversal 120 may be performed twice or more times during the expected service life of the generator 200.

In some examples, a temperature of some active elements 212, 222 may be monitored. For example, a temperature of an active stator element such as a coil and/or of an insulation of a coil may be tracked. A temperature threshold may be set, and reversal 120 may be performed when a temperature of one or more active elements 212, 222 of the generator 200 reach the temperature threshold. Inverting the direction of the cooling fluid when reaching a threshold may help to better control the temperature distribution along the active elements and the air gap 215. In general, a temperature of one or more active stator elements and/or one or more active rotor elements may be monitored. For example, the temperature of a plurality of stator elements may be tracked.

In some examples, a controller and one or more temperature sensors may be provided. The controller may be connected to the one or more temperature sensors, e.g. to two or more temperature sensors. The controller may also be connected to one or more propellers 310, 310', e.g. to a plurality of fans, and/or to one or more valves 350, e.g. to a plurality of valves. When a temperature of an active element (or of its insulation) reaches a predefined threshold, the controller may indicate the one or more propellers 310, 310' to switch their direction of rotation, or the one or more valves 350 to open or close (e.g. to open if they were closed, and to close if they were open).

In some examples, the predetermined threshold may be a maximum temperature achievable by the active elements 212, 222 during use, taking into account a possible safety margin. While in use, the temperature of the active elements 212, 222 or of their insulation may increase until a maximum temperature is reached. If the active elements are kept at such temperature during more than a certain period of time, they may fail. Therefore, reversing 120 the direction of the cooling fluid when such temperature is achieved may cool the active elements and may reduce the thermal stress of the active elements.

In some other examples, the predetermined threshold may be a temperature lower than the maximum achievable temperature during use. Examples of both situations have been schematically illustrated in FIG. 7A. This figure schematically represents the temperature of an active element $T_{AE}$, for example a coil or the insulation of a coil, as a function of time t. The full line refers 381 to a case where no reversal 120 of the direction of the cooling fluid is performed. The temperature of the active element therefore only increases until reaching a plateau. The dashed line 382 represents the evolution of the temperature of the active element or its insulation when the threshold corresponds to the maximum achievable temperature 360 and the reversal 120 is performed when reaching this threshold. Finally, the dotted line 383 represents the temperature of the active element or its insulation when a temperature threshold 365 lower than threshold 360 has been set. Thresholds 360, 365 may be referred to as upper temperature thresholds.

Figure 7A:
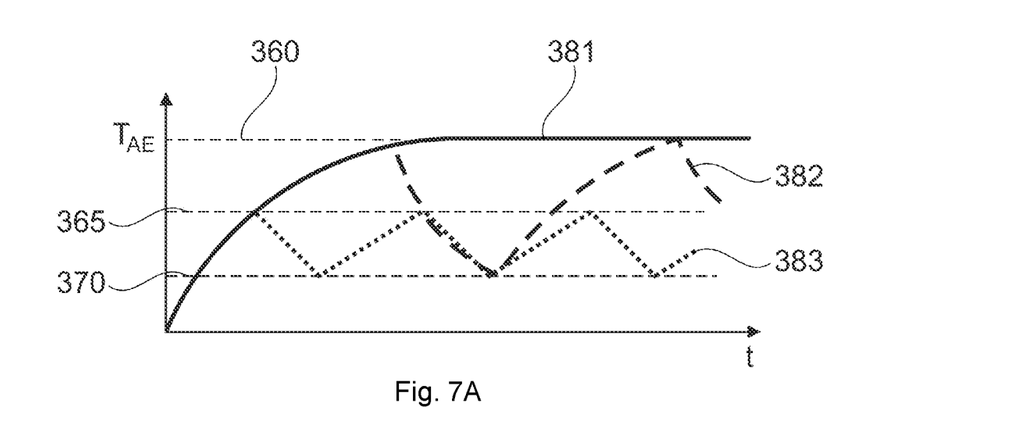
FIGS. 7A and 7B schematically illustrate the evolution of the temperature of an active rotor or stator element as a function of time and depending on the setting of temperature thresholds.

A lower temperature predetermined threshold 370 may be also set such that reversal 120 is performed when reaching the upper temperature threshold 360, 365 and also when reaching the lower temperature threshold 370. Accordingly, the temperature of the active elements may be kept within a certain temperature range bounded by the upper and lower temperature thresholds.

Figure 7B:
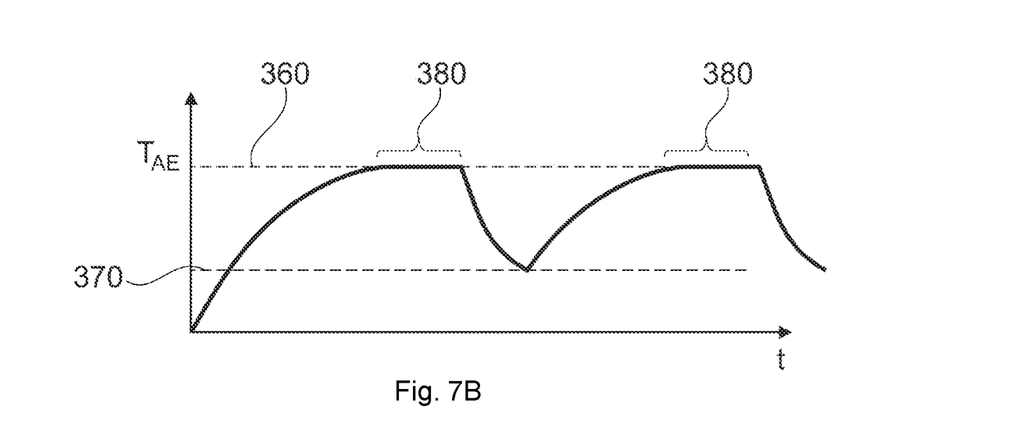

In some examples, instead of reversing 120 the direction of the flow of the cooling fluid 140 when reaching a threshold temperature 360, the reversal 120 may be performed a certain period of time 380 after the threshold 360 has been reached. This option is schematically illustrated in FIG. 7B.

In some examples, a temperature threshold may be set for a group of active elements. For example, instead of reversing 120 the flow of the cooling fluid 140 when a threshold temperature has been achieved by one active element, the flow may be reversed when more than one active element has reached the threshold. Or an average temperature threshold may be set for a group of active elements, e.g. the temperature of two or more active elements may be monitored, and when an average temperature of the two or more active elements reaches the threshold, action is taken.

In a further aspect of the present disclosure, an electrical machine assembly 400 is provided. The electrical machine assembly comprises an electrical machine 200 and a cooling system 300 fluidly connected to the electrical machine 200. The electrical machine 200 comprises a rotor 210 including a plurality of active rotor elements 212, a stator 220 comprising a plurality of active stator elements 220, and an air gap 215 separating the active rotor elements 212 and the active stator elements 222. The cooling system 300 comprises one or more entry cooling conduits 320 for guiding a cooling fluid 140 towards the air gap 215, one or more exit cooling conduits 330 for collecting and guiding the cooling fluid 140 heated in the air gap 215 away from the electrical machine 200. The cooling system 300 is configured to reverse the direction of flow of the cooling fluid 140. The cooling fluid may therefore be supplied to the air gap 215 in two different directions, e.g. in two opposite directions.

The description and explanations with regard to FIGS. 3-7B may apply to the cooling system 300 and the electrical machine 200.

The cooling system 300 may comprise one or more cooling fluid displacement devices 310, 310' configured to be rotated in two opposite directions for reversing the direction of flow of the cooling fluid. One or more fluid displacement devices may be arranged with one or more entry conduits 320 and/or with one or more exit conduits 330. The propulsors may be fans in some examples. The cooling fluid 140 may be air.

The cooling system 300 may comprise one or more additional conduits 340 configured to fluidly connect, in a selective manner, one or more entry conduits 320 and one or more exit conduits 330 such that a direction of flow of the cooling fluid 140 is inverted.

The cooling system 300 may comprise one or more valves 350 configured to be operated for redirecting the flow of the cooling fluid 140 through the one or more additional conduits 340, as explained with regard to FIGS. 6A and 6B. The one or more valves 350 may regulate the passage of the cooling fluid through the one or more additional conduits 340 by allowing or impeding the flow of the cooling fluid through the additional conduits. The valves 350 may be opened and closed as required.

The electrical machine assembly 400, e.g. the electrical machine 200, may further comprise one or more temperature sensors configured to measure a temperature of one or more active elements 212, 222 or their insulation, as explained with regard to FIGS. 7A and 7B. The assembly 400, e.g. the cooling system 300, may comprise a controller configured to instruct to change the direction of the flow of the cooling fluid based on temperature measurements of one or more temperature sensors. For example, the controller may instruct one or more propulsors 310 to change their direction of rotation or may instruct one or more valve actuators, e.g. electrical motors, to operate the valves 350 based on one or more measurements of one or more temperature sensors.

The electrical machine 200 may be a generator for a wind turbine, and more in particular for a direct drive wind turbine. An electrical machine assembly 400 may be a generator assembly, e.g. for a wind turbine, and more in particular for a direct drive wind turbine.

A wind turbine 10, and in particular a direct drive wind turbine comprising the generator assembly 400 may be provided.

In a further aspect of the disclosure, a generator assembly is provided. The generator assembly 400 comprises a generator 200 and a cooling system 300 fluidly connected to the generator 200. The generator 200 comprises a rotor 210 including a plurality of active rotor elements 212, a stator 220 comprising a plurality of active stator elements 222, and an air gap 215 separating the active rotor elements 212 and the active stator elements 222. The cooling system 300 comprises a plurality of conduits 320, 330, 340 configured to guide a cooling fluid 140 towards the air gap 215 and away from the generator 200 after the cooling fluid 140 passing through the air gap 215. The cooling system 300 is configured to selectively guide the cooling fluid 140 in a first direction or in a second direction different from the first direction such that the cooling fluid 140 is run in two different directions through the air gap 215.

The cooling system 300 may comprise one or more bidirectional fans 310, 310' configured to guide the cooling fluid 140 in the first and the second directions.

The cooling system 300 may further comprise a heat exchanger 315 fluidly connected to a plurality of conduits 320, 330 configured to guide the cooling fluid 140 towards and away from the air gap 215. One or more bidirectional fans 310, 310', including all the fans, may be comprised in the heat exchanger 315. For example, one or more bidirectional fans for propelling the cooling fluid towards and away from the generator may be comprised in the heat exchanger 315.

The cooling system 300 may comprise a plurality of valves 350 configured to regulate the flow of the cooling fluid 140 through the plurality of conduits 320, 330, 340 such that the cooling fluid 140 may flow in the first direction and in the second direction.

A wind turbine 10, and in particular a direct drive wind turbine comprising the generator assembly 400 may be provided.

The description and explanations with regard to FIGS. 3-7B may apply to the cooling system 300 and the generator 200.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for cooling an electrical machine that has a rotor including a plurality of active rotor elements, a stator including a plurality of active stator elements, and an air gap separating the active rotor elements and the active stator elements, the air gap extending axially between a front cover and a back cover of the electrical machine, the method comprising:
   supplying a cooling fluid from an entry cooling conduit to the air gap through one or more primary inlets of the electrical machine for cooling the plurality of rotor or stator active elements;
   the cooling fluid moving from the entry cooling conduit through the primary inlets in a first axial direction through the air gap between the front cover and the back cover and then exiting through a primary outlet to an exit cooling conduit;
   with a controller and one or more temperature sensors, monitoring a temperature of one or both of the stator and rotor active elements;
   upon the monitored temperature reaching a defined temperature threshold, the controller switching operation of fluid displacement devices in the electrical machine to reverse direction of flow of the cooling fluid such that the cooling fluid moves through the air gap between the front cover and the back cover in an opposite second axial direction and is extracted from the electrical machine through one or more of the primary inlets; and
   wherein the fluid displacement devices are operated to cross-connect and divert the cooling fluid from the entry cooling conduit to the exit cooling conduit to introduce the cooling fluid through the primary outlet and through the air gap in the second axial direction prior the cooling fluid exiting through the primary inlet and into the entry cooling conduit.

2. The method of claim 1, wherein in addition to the temperature monitoring, operation time of the electrical machine is monitored such that the cooling fluid is supplied in the first axial direction during a first period, and the cooling fluid is supplied in the second axial direction during a second period.

3. The method of claim 1, wherein the fluid displacement devices include controllable valves and additional conduits cross-connecting the entry and exit cooling conduits, the reversing step comprising controlling the valves to selectively fluidly cross-connect the entry and exit cooling conduits via the additional conduits.

4. The method of claim 1, wherein the cooling fluid is air.

5. The method of claim 1, wherein the fluid displacement devices include controllable valves, the reversing step comprising controlling the valves to selectively fluidly cross-connect the one or more entry cooling conduit with the exit cooling conduit.

6. An electrical machine assembly, comprising:
   an electrical machine comprising a rotor including a plurality of active rotor elements, a stator including a plurality of active stator elements, and an air gap separating the active rotor elements and the active stator elements;
   a cooling system comprising one or more entry cooling conduits configured to guide a cooling fluid towards the air gap, and one or more exit cooling conduits configured to collect and guide the cooling fluid heated in the air gap away from the electrical machine;
   one or more temperature sensors configured to measure a temperature of one or more of the active rotor or stator elements;
   controllable fluid displacement devices;
   a controller in communication with the temperature sensors and, upon the monitored temperature reaching a defined temperature threshold, configured to switch operation of the fluid displacement devices to reverse direction of flow of the cooling fluid through the entry and exit cooling conduits; and
   wherein the controllable fluid displacement devices comprise cross-connect conduits between the one or more entry cooling conduits and the one or more exit cooling conduits, and controllable valves that divert the cooling fluid from the one or more entry cooling conduits through the cross-connect conduits and into the one or more exit cooling conduits to reverse the direction of flow of the cooling fluid through the air gap.

7. The electrical machine assembly of claim 6, wherein the cooling fluid displacement devices comprises fans.

8. A method for cooling an electrical machine that has a rotor including a plurality of active rotor elements, a stator including a plurality of active stator elements, and an air gap separating the active rotor elements and the active stator elements, the method comprising:
   supplying a cooling fluid to the air gap through an entry cooling conduit to one or more primary inlets of the electrical machine for cooling the plurality of rotor or stator active elements;
   extracting the cooling fluid from the electrical machine via one or more primary outlets of the electrical machine and then through an exit cooling conduit;
   reversing a direction of axial flow of the cooling fluid through the air gap by switching operation of fluid displacement devices in the electrical machine to cross-connect the entry and exit cooling conduits such that the cooling fluid is diverted from the entry cooling conduit to the exit cooling conduit and then supplied to the air gap through one or more of the primary outlets and extracted from the electrical machine through one or more of the primary inlets and then diverted from the exit cooling conduit into the entry cooling conduit.

* * * * *